United States Patent [19]

Keba et al.

[11] Patent Number: 5,606,728
[45] Date of Patent: Feb. 25, 1997

[54] METHOD AND APPARATUS FOR REDUCING POWER CONSUMPTION IN A SELECTIVE CALL RADIO

[75] Inventors: James M. Keba, Wellington, Fla.; Leon Jasinski, Clontarf, Australia

[73] Assignee: Motorola, Inc., Schaumburg, Ill.

[21] Appl. No.: 463,535

[22] Filed: Jun. 5, 1995

[51] Int. Cl.$^6$ ............................. H04B 7/00; H04Q 3/02; H04Q 9/14

[52] U.S. Cl. .................. 455/38.3; 455/343; 340/825.44; 340/825.22

[58] Field of Search .................................. 455/38.3, 343; 340/825.44, 825.22; 379/57, 58

[56] References Cited

U.S. PATENT DOCUMENTS

| | | | |
|---|---|---|---|
| 3,937,004 | 2/1976 | Natori et al. | 455/166.1 |
| 4,903,319 | 2/1990 | Kasai et al. | 455/33.2 |
| 5,140,702 | 8/1992 | Laflin | 455/130 |
| 5,376,929 | 12/1994 | Rakolta et al. | 455/38.3 |
| 5,381,133 | 1/1995 | Erhart et al. | 455/343 |
| 5,392,023 | 2/1995 | D'Avello et al. | 455/343 |
| 5,438,701 | 8/1995 | Yamada et al. | 455/343 |
| 5,475,374 | 12/1995 | Moore | 455/343 |
| 5,541,976 | 7/1996 | Ghisler | 455/343 |
| 5,542,117 | 7/1996 | Hendricks et al. | 455/343 |

*Primary Examiner*—Reinhard J. Eisenzopf
*Assistant Examiner*—Marsha D. Banks-Harold
*Attorney, Agent, or Firm*—James A. Lamb

[57] ABSTRACT

A technique substantially reduces power consumption of a selective call radio (106) while the selective call radio (106) is in an inactivated state. During the inactivated state a power state of the selective call radio (106) is cycled at an inactivated duty cycle and a first selective call message having a selective call address of the selective call radio (106) is received and processed. An activation mode of the selective call radio (106) is set to an activated state during which the power state of the selective call radio (106) is cycled at an activated duty cycle. The activated duty cycle is substantially greater than the inactivated duty cycle. The activation mode of the selective call radio is set to the activated state in response to an activation command generated during the inactivated state.

16 Claims, 5 Drawing Sheets

1

METHOD AND APPARATUS FOR REDUCING POWER CONSUMPTION IN A SELECTIVE CALL RADIO

FIELD OF THE INVENTION

This invention relates in general to reducing power consumption in a selective call radio, and in particular to a method and apparatus for automatically activating a selective call radio and achieving significant reduction of power consumption by the selective call radio while the selective call radio is in an inactivated state.

BACKGROUND OF THE INVENTION

Selective call radios such as pagers are small enough today that they can be included in portable devices having other functions. An example of such a portable device is a watch which includes a pager, of which several brands are marketed today. Another example is a portable telephone, such as a Silverlink™ telephone, manufactured by Motorola, Inc., of Schaumburg, Ill., which includes a pager. A third example is a personal digital assistant, such as an Envoy™ manufactured by Motorola, Inc., of Schaumburg, Ill. It is desirable in some circumstances to be able to sell the portable device with the selective call radio included, but not activated, with activation of the pager anticipated significantly after the sale. For instance, a low cost pager may be included in an expensive watch. The manufacturer may decide that many of the customers buying the watch would be willing to buy it without the pager being activated, with or without potential later activation in mind at the time of the purchase. The cost of the paging feature could be underwritten by a service provider as a means to entice additional customers, keeping the price of the watch competitive with others having the same features (except for the pager). In the instance of the watch, the activation of the pager may not be accomplished by the seller, but rather the buyer, and under this circumstance, it is desirable to have the pager deactivated until the buyer authorizes activation.

In another example, in which a selective call radio is inactivated for a relatively long period of time before it is activated for use, the selective call radio is not included in a portable device, but is purchased in one country for use in another country at the completion of a trip which is several weeks long.

When a selective call radio is not activated for a relatively long period, as described above, it is desirable to reduce the power drain of the selective call radio to a very low level so that the selective call radio does not significantly shorten the life of the battery supplying power to the selective call radio. When activation of the selective call radio is ultimately authorized, it is desirable to have the activation accomplished automatically, thereby avoiding an inclusion of an activation function as another operator function of the selective call radio or portable device, and thus also avoiding any inadvertent activation of the selective call radio.

Thus, what is needed is a technique for automatically activating a selective call radio and for substantially reducing power consumption of the selective call radio while the selective call radio is not activated.

SUMMARY OF THE INVENTION

Accordingly, in a first aspect of the present invention, a method is used within a selective call radio for substantially reducing power consumption of the selective call radio while the selective call radio is in an inactivated state. The selective call radio is for receiving digital signals having a periodic protocol. The digital signals are transmitted by radio signals in a radio system. The method includes the several steps. In one of the steps a selective call address is stored within the selective call radio. In another step, an activation mode of the selective call radio is set to the inactivated state. During the inactivated state a power state of the selective call radio is cycled at an inactivated duty cycle and a first selective call message having the selective call address is received and processed. In another step, the activation mode of the selective call radio is set to an activated state during which the power state of the selective call radio is cycled at an activated duty cycle. The activated duty cycle is substantially greater than the inactivated duty cycle. The activation mode of the selective call radio is set to the activated state in response to an activation command generated during the inactivated state set in said step of setting the activation mode to the inactivated state.

Accordingly, in a second aspect of the present invention, a selective call radio is described within which power consumption is substantially reduced while the selective call radio is in an inactivated state. The selective call radio is for receiving digital signals having a periodic protocol. The digital signals are transmitted by radio signals in a radio system. The selective call radio includes a memory, a receiver section, and a controller. The memory stores a selective call address within the selective call radio. The receiver section receives radio signals. The controller, which is coupled to the memory and the receiver section, acquires synchronization, and decodes and processes selective call messages from the radio signals.

The controller includes an activation mode element, an inactivated state element, and an activated state element. The activation mode element sets an activation mode of the selective call radio to one of the inactivated state and an activated state. The inactivated state element, which is coupled to the activation mode element, operates the selective call radio in the inactivated state. During the inactivated state a power state of the selective call radio is cycled at an inactivated duty cycle. During the inactivated state a first selective call message having the selective call address is received and processed. The activated state element, which is coupled to the activation mode element, operates the selective call radio in the activated state. During the activated state the power state of the selective call radio is cycled at an activated duty cycle which is substantially greater than the inactivated duty cycle. The activation mode element sets the activation mode to the activated state in response to an activation command generated during the inactivated state.

DETAILED DESCRIPTION OF THE INVENTION

Figure 1:
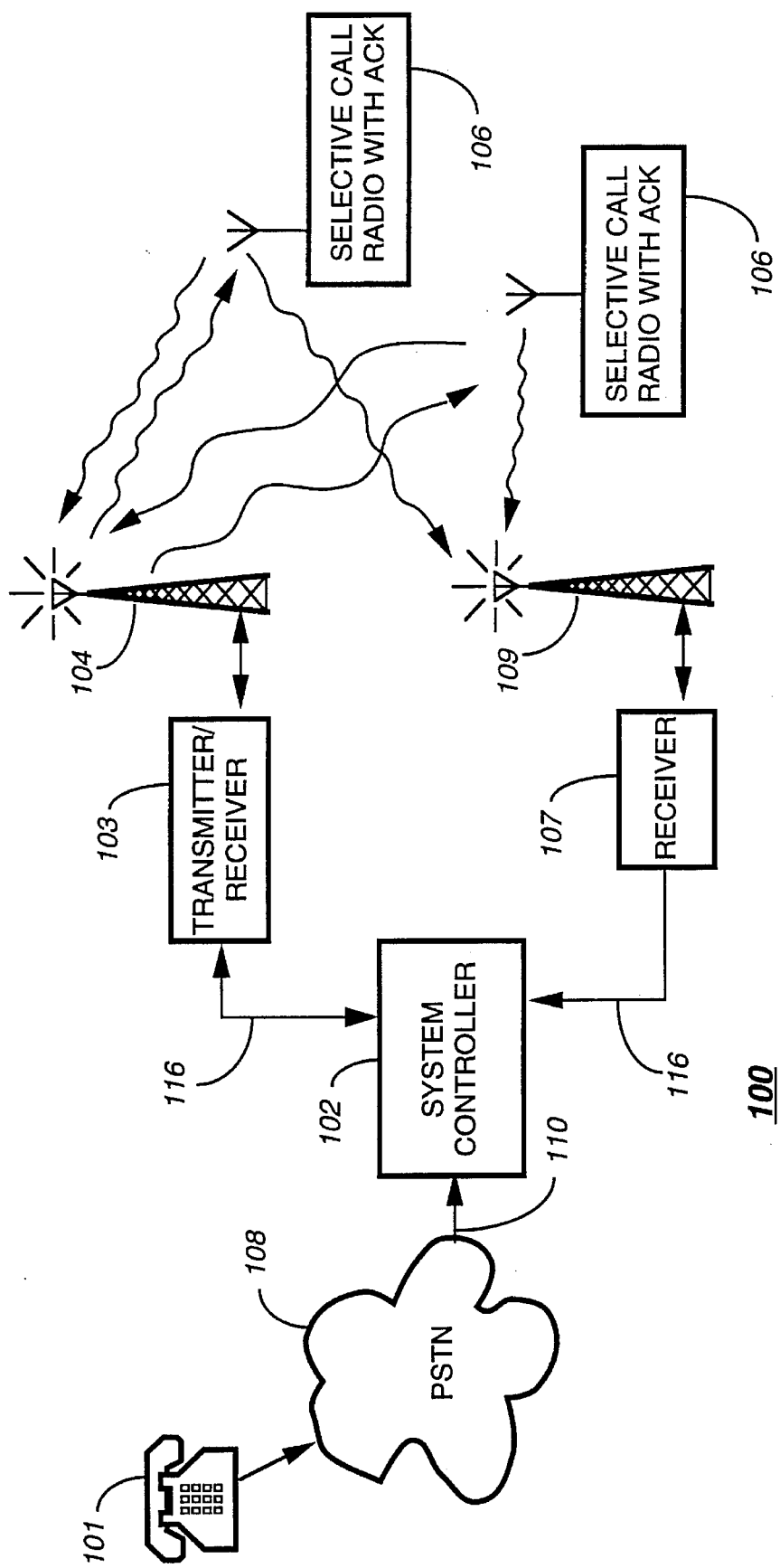
FIG. 1 is an electrical block diagram of a radio communication system, in accordance with a preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101 connected through a conventional switched telephone network (PSTN) 108 by conventional telephone links 110 to a system controller 102. The system controller 102 oversees the operation of at least one radio frequency transmitter/receiver 103 and at least one fixed system receiver 107, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to digitally encode and schedule outbound messages, which can include such information as digitized audio messages, alphanumeric messages, analog information, and response commands, for transmission by the radio frequency transmitter/receivers 103 to a plurality of multichannel selective call radios 106. The system controller 102 further functions to decode inbound messages, including unsolicited and response messages, received by the radio frequency transmitter/receivers 103 and the fixed system receivers 107 from the plurality of selective call radios 106.

An example of an outbound alphanumeric message intended for a selective call radio 106 is a page message entered from the telephone 101. The outbound messages are included in outbound radio signals transmitted from a conventional antenna 104 coupled to the radio frequency transmitter/receiver 103. The inbound messages are included in inbound radio signals received by the conventional antenna 104 coupled to the radio frequency transmitter/receiver 103 and the conventional antenna 109 coupled to the fixed system receiver 107.

It should be noted that the system controller 102 is capable of operating in a distributed transmission control environment that allows mixing conventional cellular, simulcast, master/slave, or other coverage schemes involving a plurality of radio frequency transmitter/receivers 103, conventional antennas 104, 109, and fixed system receivers 107, for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should also be noted that the radio frequency transmitter/receiver 103 may comprise the fixed system receiver 107 collocated with a conventional radio frequency transmitter.

It will be appreciated that other selective call radio devices (not shown in FIG. 1), such as one and two way pagers, conventional mobile cellular telephones, conventional mobile radios, conventional mobile cellular telephones or trunked mobile radios, which have single or multichannel receiving capability and which optionally have a data terminal attached thereto, or optionally have mobile data terminal capability built in, are also able to be used in the radio communication system 100. In accordance with the preferred embodiment of the present invention, the term "selective call radio" will be used to refer to a receive only pager which is included in a battery operated watch, but could alternatively be another type of two way selective call radio included with another battery operated device, such as a two way pager in a portable bedside alarm clock. In an alternative embodiment of the present invention which shares the advantages afforded in the preferred embodiment, the selective call radio is not included in a battery operated watch or with other battery device. Each of the selective call radios assigned for use in the radio communication system 100 has an address assigned thereto which is a unique selective call address. The address enables the transmission of a message from the system controller 102 only to the addressed selective call radio, and identifies messages and responses received at the system controller 102 from the selective call radio. Furthermore, each of one or more of the selective call radios also has a unique telephone number assigned thereto, the telephone number being unique within the PSTN 108. A list of the assigned selective call addresses and correlated telephone numbers for the selective call radios is stored in the system controller 102 in the form of a subscriber data base.

Figure 2:
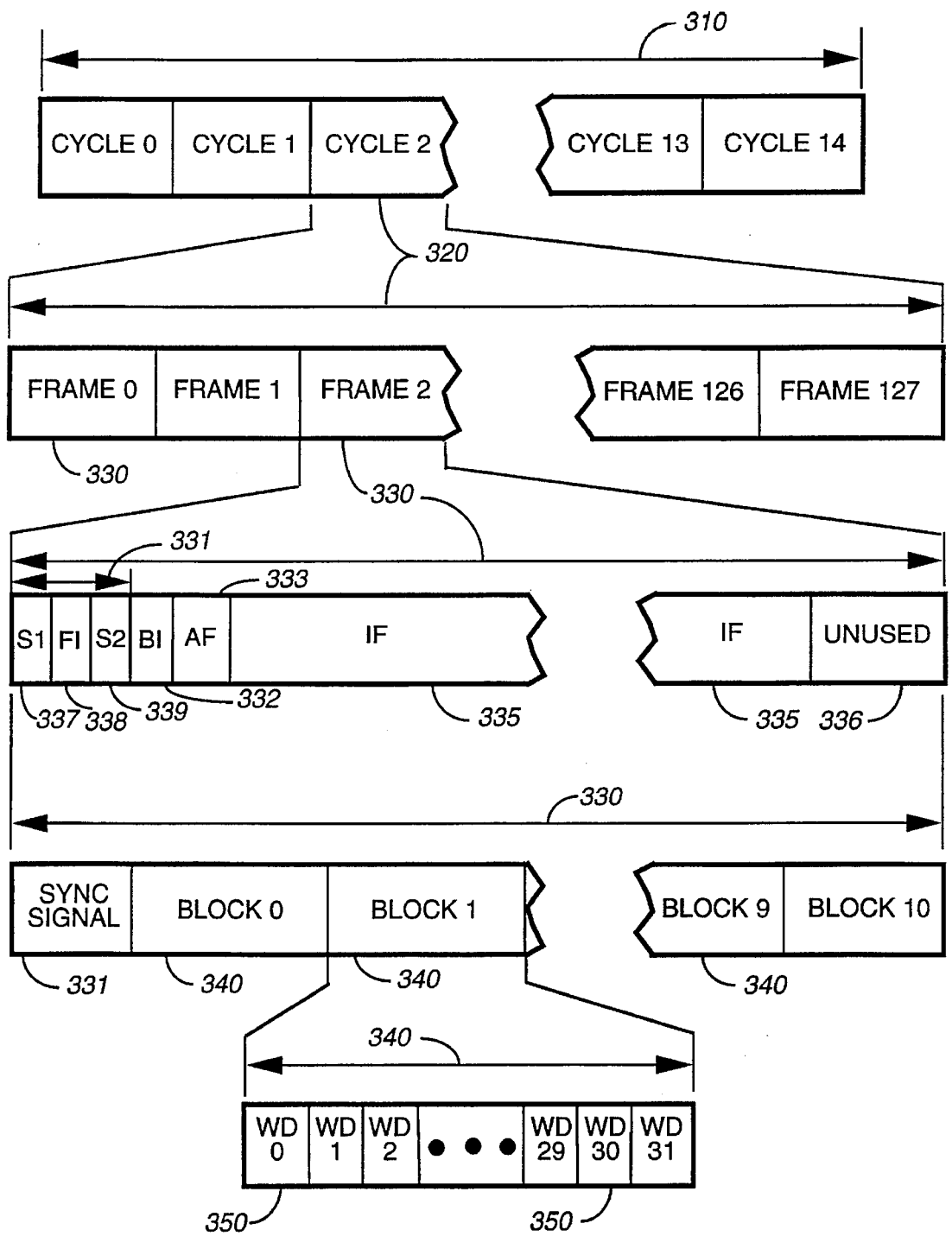
FIG. 2 is a timing diagram of frames included in a radio signal transmitted by a transmitter in radio communication system, in accordance with the preferred embodiment of the present invention.

Referring to FIG. 2, a timing diagram illustrating features of the transmission format of an outbound signaling protocol utilized by the radio communication system of FIG. 1 to transmit a message from the system controller 102 to the selective call radio 106 is shown, in accordance with the preferred and alternative embodiments of the present invention. The signaling protocol is preferably the FLEX™ protocol, which is a synchronous outbound signaling protocol having protocol divisions of cycle, frame, block, word, symbol, and bit. The outbound signaling protocol is subdivided into protocol divisions, which are an hour 310, a cycle 320, a frame 330, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the frames 330. The synchronization signal 331 includes a first sync portion 337, a frame information word 338, and a second sync portion 339. The frame information word 338 includes 21 information bits and 11 parity bits. The information bits identify a cycle number, a frame number, and include a bit which is set to one to indicate a global event. A bit rate of 1600 bits per second (bps), 3200 bps, or 6400 bps is usable during the blocks of each frame 330. The bit rate of the blocks of each frame 330 is communicated to the selective call radios 106 during the synchronization signal 331. When the bit rate is 1600 bps, 8 thirty two bit uniquely identified words 350 are transmitted in each block 340. For bit rates of 3200 bps or 6400 bps, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are for information, in a manner well known to one of ordinary skill in the art. The bits and words 350 in each block 340 are transmitted in an interleaved fashion using techniques well known to one of ordinary skill in the art to improve the burst error correction capability of the protocol.

Information is included in each frame 330 in fields, comprising system information in the frame information word 338 and a block information field (BI) 332, one or more selective call addresses in an address field (AF) 333, one or more of a set of vector packets, short message packets, and long messages in the information field (IF) 335, and an unused field 336 having no useful information therein. One aspect of system information included in the frame information word 338 is the frame number, a number from zero to one hundred twenty seven which identifies each frame 330 of a cycle 320. Each vector packet and short message packet in the information field 335 of a frame 330 corresponds to at least one of the addresses in the address field 333 of the same frame 330. Each long message in the information field 335 corresponds to at least one vector packet in the information field 335 of at least one or more frames 330. The boundaries of the fields 332, 333, 335, 336 are defined by the words 350, not by the blocks 340, and the length of the fields 332, 333, 335, 336 are variable, depending on factors such as the type and amount of system information included in the block information field 332, the type of addresses used, and the amount of information in each message. Thus, the length of each of the fields 332, 333, 335, 336 can be shorter or longer than a block 340. The unused field 336 can be zero length when the total of the lengths of the other fields 332, 333, 335 equals eleven blocks 340. All vector packets and short messages intended for a particular selective call radio 106 which has been activated for standard service are preferably scheduled for transmission in a predetermined one of the frames 330 of each cycle 320, so as to allow the particular selective call radio 106 to go into a low power (non-receive) mode during other frames when short messages and vectors are not included for the particular selective call radio 106. The block information field 332 in frame zero includes the following real time information: year, month, day, date, hour, minute, and one-eighth minute.

The vectors contain information which specifies the starting word of a long message in terms of the protocol divisions described above, and additionally, radio channel information such as radio channel frequency, subchannel offset from the radio channel frequency. The starting position and length of a long message, a short message, or a vector packet define the protocol position of the long message, short message, or vector packet.

When a selective call radio 106 detects its address within a frame 330, the selective call radio 106 processes the associated vector packet or short message packet within the frame 330. When a selective call radio 106 decodes a vector packet in a frame 330 which corresponds with its selective call address, the selective call radio 106 is directed to receive and decode a long message in either the same frame 330, or another frame 330.

Figure 3:
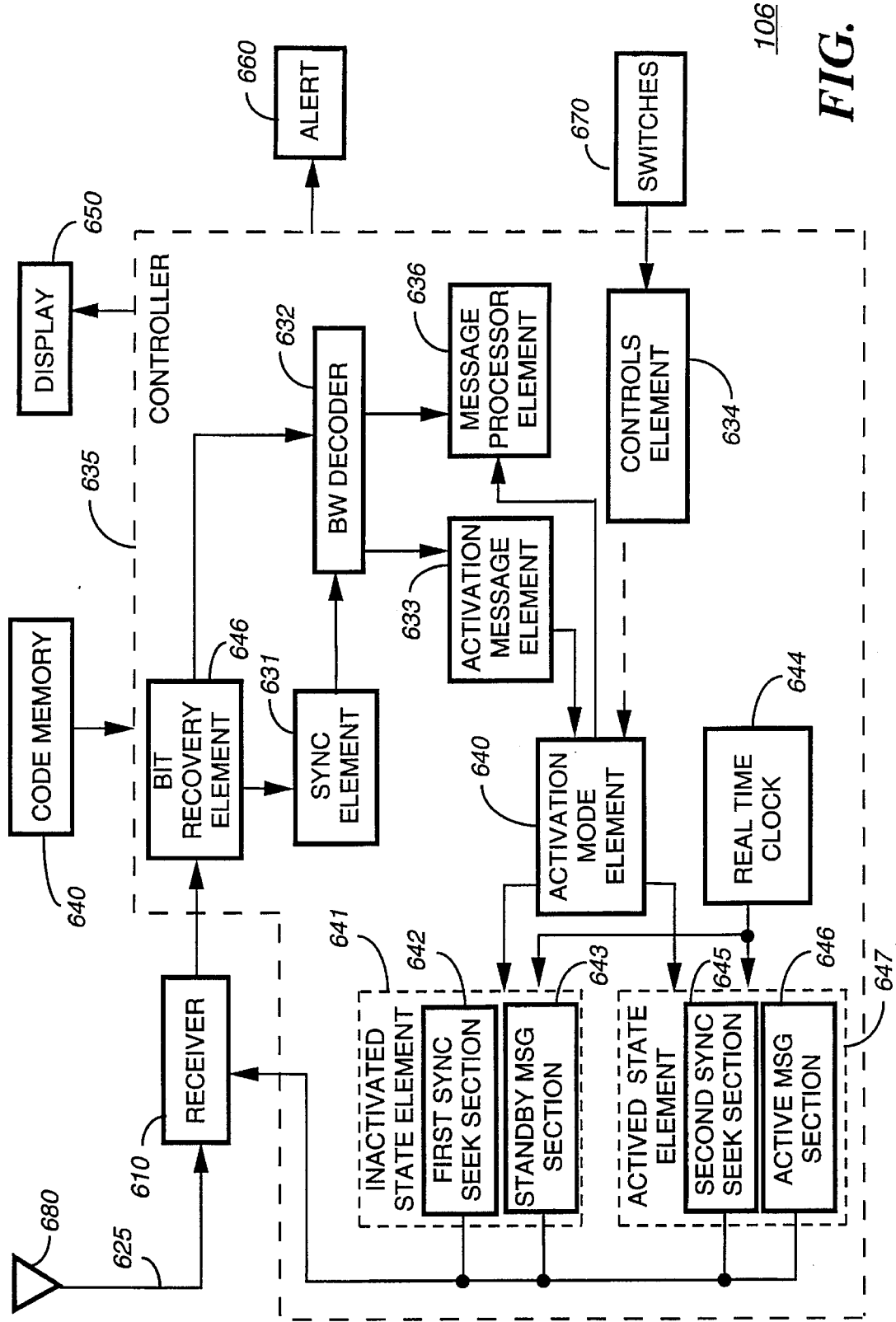
FIG. 3 is an electrical block diagram of a selective call radio used in the radio communication system, in accordance with the preferred embodiment of the present invention.

Referring to FIG. 3, an electrical block diagram of a multichannel selective call radio 106 is shown, in accordance with the preferred embodiment of the present invention. The selective call radio 106 includes an antenna 680 for intercepting radio signals to receive digital signals. The antenna 680 is coupled to a conventional receiver 610 wherein the intercepted signal 625 is received, which includes filtering to remove undesirable energy at off channel frequencies, amplification of the filtered signal, frequency conversion of the signal 625, and demodulation of the signal 625 in a conventional manner. The receiver 610 thereby generates a demodulated signal which is coupled to the bit recovery element 615 of the controller 635. The receiver 610 has a demodulated output and a power control input coupled to a controller 635. The controller 635 is coupled to a code memory 655, a display 650, an alert 660, and a set of switches 670. The controller 635 comprises a bit recovery element 615, a block word decoder 632, a synchronization (SYNC) element 631, a message processor element 636, an activation message element 633, a controls element 634, an activation mode element 640, an inactivated state element 641, an activated state element 647, and a real time clock 644. The demodulated signal is coupled to the bit recovery element 615, wherein demodulated data symbols are converted to binary data, generating a digital signal. The binary data is coupled to the sync element 631 and the block word decoder 632. The sync element 631 is coupled to the block word decoder 632 for enabling the block word decoder 632 when synchronization to the outbound signaling protocol is acquired from a digital signal included in the radio signals intercepted by the antenna 680. The block word decoder 632 decodes the words 350 included in the blocks 340 of the outbound signaling protocol. The block word decoder is coupled to the activation message element 633, which decodes an activation message. The block word decoder is further coupled to the message processor element 636, which decodes all messages except the activation message, and processes the messages when a selective call address in the digital signal corresponding to the activation message matches an embedded address stored in the code memory 655. The activation message element 633 is coupled to the activation mode element 640, which is coupled to the inactivated state element 641, the activated state element 647, the sync element 631, and the message processor element 636. The real time clock 644, which provides conventional real time clock functions, is coupled the inactivated state element 641 and the activated state element 647.

In accordance with the preferred embodiment of the present invention, the selective call radio 106 operates in one of two states of an activation mode, an inactivated state or an activated state. In each state of the activation mode, a corresponding one of the inactivated state element 641 and the activated state element 647 generates a power control signal 648, which alternates between a low power state and a normal power state. In the low power state, the receiver 610 is turned off, which prevents the selective call radio 106 from receiving any radio signals and substantially reduces the average power consumption of the selective call radio 106 in comparison to the power consumption during the normal power state. The inactivated state element 641 comprises a first synchronization (SYNC) seek section 642 and a standby message (MSG) section 643. The inactivated state element 641 enables either the first sync seek section 642 or the standby message section 643, but not both simultaneously, to generate the power control signal 648 which periodically cycle between the low power state and the normal power state at a duty cycle, which is described in more detail below. The activated state element 647 comprises a second synchronization (SYNC) seek section 645 and an active message (MSG) section 646. The activated state element 647 enables either the second sync seek section 645 or the active message section 646, but not both simultaneously, to generate the power control signal 648 which periodically cycle between the low power state and the normal power state at a duty cycle, which is described in more detail below. The first and second sync seek sections are activated whenever the sync element 631 is not able to acquire synchronization with a synchronization signal 331, until such time as the sync element 631 requires synchronization from a synchronization signal 331. A signal indicating whether synchronization is acquired or not is coupled to the inactivated state element 641 and activated state element 647 from the sync element 631 through the activation mode element 640.

Figure 4:
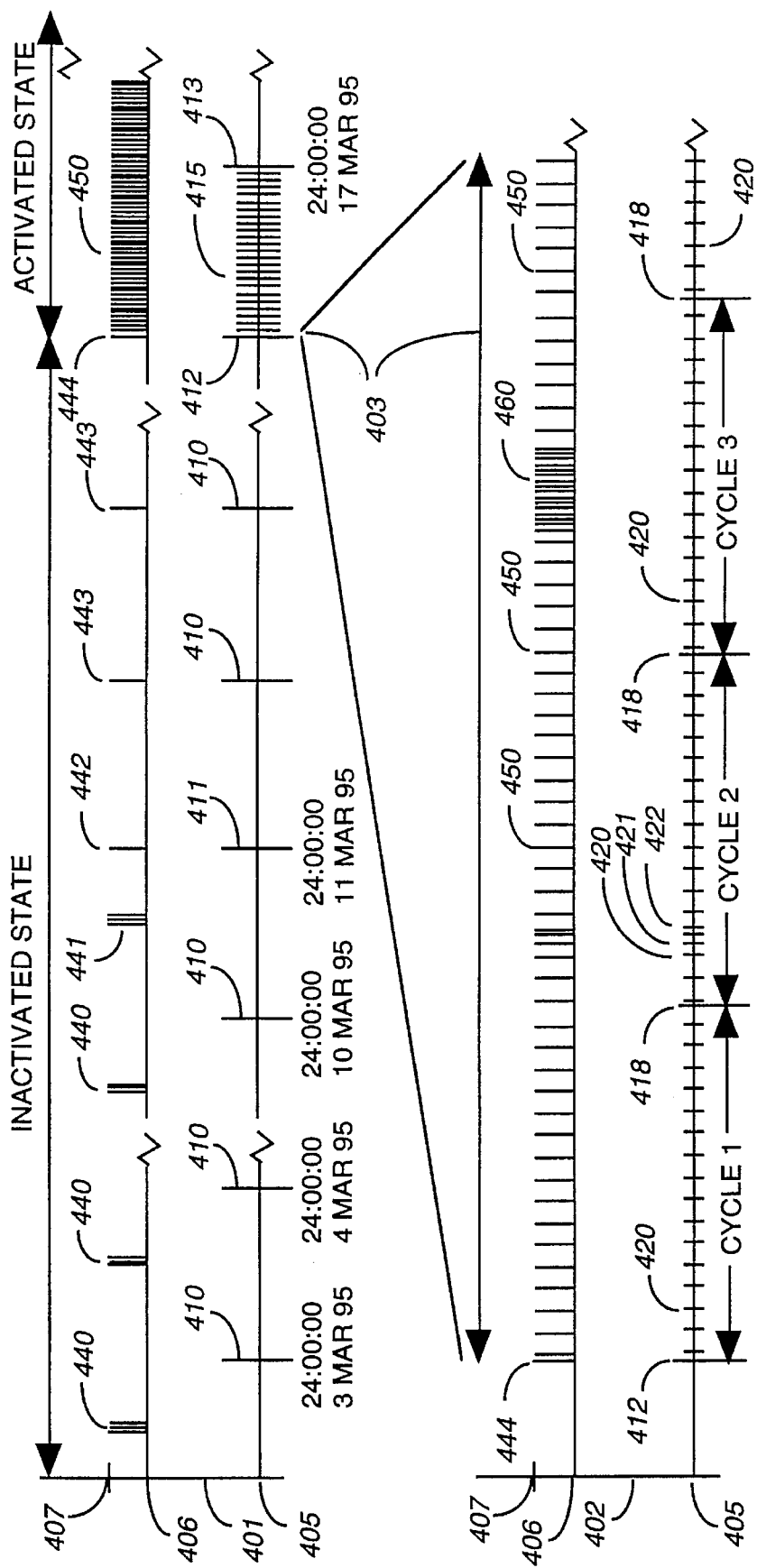
FIG. 4 is a timing diagram of a power mode signal generated in the selective call radio, in accordance with the preferred embodiment of the present invention.

Referring to FIG. 4, a timing diagram of an example of the power control signal 648 is shown, in accordance with the preferred embodiment of the present invention. The example of the power control signal 648 is shown for one set of circumstances. An upper timing chart 401 is shown which includes a time line 405, a low power state value 406 of the power control signal 648, and a normal power state value 407 of the power control signal 648. A lower timing chart 402 is shown which is an expansion of a small portion 403 of the upper timing chart, and which includes the time line 405, the low power state value 406, and the normal power state value 407. In the example shown, the time line 405 in the upper timing chart 401 starts before 24:00:00 (midnight in military time designation) on 3 Mar. 1995 and extends past 24:00:00 on 17 Mar. 1995. Day markers 410, 411, 412, 413 are shown across the time line 405 in the upper timing chart 401, and hour markers 415 are shown only for the period from 24:00:00 on 16 Mar. 1995 (day marker 412) to 24:00:00 on 17 Mar. 1995 (day marker 413). Day marker 412 is also shown on the lower timing chart 402, along with cycle markers 418, which are 4 minutes apart. The first three complete cycles of the hour starting at 24:00:00 on 16 Mar. 1995 are shown in the lower timing chart 402.

In the example shown in FIG. 4, the selective call radio 106 is fabricated before 3 Mar., 1995, at which time the activation mode element 640 is set to the inactivated state. The selective call radio 106 does not receive a radio signal having the outbound signaling protocol in accordance with the preferred embodiment of the present invention, so the inactivated state element 641 generates the power control signal using the first sync seek section 642. The selective call radio 106 is shipped to a point of sale, where it is sold to a user on 4 Mar. 1995. During the period from 3 Mar. 1995 to 11 Mar. 1995, the first sync seek section 642 generates the power control signal 648 to have first sync seek periods 440, 441, each consisting of one hundred sixty periodic normal power state levels generated at uniform intervals of 1.5 seconds for four minutes, each of which lasts one hundred milliseconds (msec), once every twenty four hours (in FIG. 4, the one hundred sixty periodic levels are represented by three lines due to drawing scaling issues). This timing of the normal power level states during the first sync seek periods 440, 441 substantially guarantees that when a radio signal having a signal strength above a threshold is received at the selective call radio 106 and which includes the outbound signaling protocol in accordance with the preferred embodiment of the present invention, the sync element 631 will decode the sync signal 331 (FIG. 2), and acquire symbol, word 350, block 340, frame 330, cycle 320, and hour 310 synchronization with the outbound signaling protocol. After 24:00:00 on 10 Mar. 1995, the user brings the selective call radio 106 within range of a transmitter/receiver 103 such that a radio signal above the signaling threshold is intercepted by the antenna 680 during sync seek period 441. The bit recovery element 615 recovers bits from the data symbols received at a predetermined outbound data rate in the demodulated signal, generating a binary signal. The binary signal includes the information transmitted in the frames 330 of this example in the form of data symbols, with errors possibly induced during the radio communication of the signal. The binary signal is coupled to the sync element 631 and the block word decoder 632. The sync element 631 acquires symbol, word 350, block 340, frame 330, cycle 320, and hour 310 synchronization in a conventional manner. Synchronization having been acquired, the inactivated state element 641 immediately terminates the generation of the power control signal 648 from the first sync seek section 642 and begins generating the power control signal 648 from the standby message section 643, which changes the power control signal to the normal power state one second before the beginning of hour 24 (that is, at 23:59:59), in what is referred to hereafter as a standby message activation 442, 443, 444. This timing substantially guarantees that the receiver 610 is changed to the normal power state prior to the interception of the portion of the outbound signaling protocol which beings at 24:00:00, in spite of a possible difference between the clock generating the outbound signaling protocol and the real time clock 644, which has a 10 part per million (ppm) maximum error of its crystal time base (not shown in FIG. 4). When the receiver 610 is activated by the normal power state level of the power control signal 648 and the selective call radio 106 intercepts a radio signal above the threshold level at the 24:00:00 time on 11 Mar. 1995, the block word decoder 632 performs error detection and correction decoding of the words 350 from the blocks 340, of frame 0 of cycle 0 in a manner well known to one of ordinary skill in the art. The controller 635 is coupled to a code memory 655, in which is stored one or more selective call addresses assigned to the selective call radio 106, such as a local address (used in a "home" portion of the radio communication system 100), a "roaming" address (used in other portions of the radio communication system 100), and a group address (shared with other "home" selective call radios 106). The assigned address(es) are also referred to herein as the embedded addresses. When the controller 635 determines that the address field 333 does not include any selective call address which matches any embedded address, the activation mode element 640 is left in the inactivated state, and the standby message section 643 switches the power state to the low power state. Also, when the controller 635 determines that the address field 333 does include a selective call address which matches any embedded address, but no activation indication message is included which corresponds to the selective call address, the activation mode element 640 is left in the inactivated state, and the standby message section 643 switches the power state to the low power state. (This situation could arise, for example, when a group call or all call address is received). This standby message activation 442 of the receiver 610 from one second before the beginning of hour 24 until the end of the address field typically lasts no more than 1.2 seconds, and rarely lasts more than 1.6 seconds. The standby message activation 443 is repeated by the standby message section 643 at every 23:59:59 time for a short time lasting typically 1.2 seconds (sec), until a digital signal received during a standby message activation 444 is sufficiently error free, and one of the outbound selective call addresses in the recovered frame 330 matches an embedded selective call address, and an activation indication is received in a message in the frame of the digital signal which corresponds to the embedded address.

It will be appreciated that the duty cycle during the periodic portion of the power control signal which is generated by the first sync seek section is (160'0.1) sec/(24× 60×60) sec, or 0.000185, and during the periodic portion of the power control signal which is generated by the standby message section is approximately +e,fra 1.2+ee sec/(24×60×

60) sec, or 0.0000139. The activation message element 633 decodes the activation indication and couples the result to the activation mode element 640, which changes the activation mode of the selective call radio 106 to the activated state. Because synchronization is acquired, the activated state element 647 uses the active message section 646 to generate the power control signal. When the selective call radio 106 is operated in the activated mode, the power control signal 648 has a duty cycle 450 which substantially greater than in the inactivated mode, as described below.

The standby message activation 444 in which the activation indication is received is near the beginning of the expanded portion 403 of the time line 405 and power control signal 648 shown in the lower portion of FIG. 4. When the power control signal 648 is generated by the active message section 646 in the activated mode, the receiver 610 is activated by the power control signal 648 at the beginning of each occurrence of sixteen predetermined frames 420 (frame numbers 3, 11, 19, 27, 35, 43 . . . 123 in this example) in each cycle (each cycle having a duration of four minutes). The power control signal 648 is changed to the normal power level for short periods of time as illustrated by the pulses 450. These frames are hereafter termed active frames, although it will be appreciated that the selective call radio 106 need not be active during the entire active frame. The block word decoder 632 is enabled by the activation mode element 640 to receive messages other than the activation indication when the activation mode element 640 is in the activated state. Decoded words are coupled to the message processor element 636, which is also coupled to the power control signal (coupling not shown in FIG. 4) for activating the receiver 610 during words 350 of the cycles 320 in which words intended for the selective call radio 106 are expected, which can be during frames 320 other than the predetermined frames. This is illustrated in FIG. 4 by words occurring in frames 420, 421, 422 in cycle 2, during which the power control signal 648 is set to the normal power level. The message processor element 636 reconstructs messages received in this manner, such as alphanumeric messages or voice messages. When the activation mode element 640 is in the inactivated state, the block word decoder 632 is disabled. It will be appreciated that in some radio communication systems 100 and with other predetermined battery saving modes, the receiver 610 is activated for more or less frames in each cycle, for example, 1, or 4, or 128, than described in the example. It will be appreciated that the number of active frames directly affects a measurement of the average delay between an entry of a message into the system controller 102 and the processing of the message at the selective call radio 106, which is termed the message latency. In typical systems an expected message latency less than 30 seconds is appropriate for active users, so the use of 16 active frames during every cycle (15 seconds between active frames) is typical. It will be appreciated that the portion of the expected message latency contributed by the interval between active frames, which is hereinafter termed scanning latency, is one half of the interval between active frames, or approximately 7.5 seconds. The remaining portion of the expected message latency (approximately 22.5 seconds) is contributed essentially by delays in the communication links 116, system controller 102, and the transmitter/receiver 103, and is typically less than 25 seconds. Fewer active frames improve battery life but increase the scanning latency. For example, the use of one active frame per cycle would increase the message latency to approximately 2 and a half minutes, which is approximately the maximum acceptable message latency for an activated selective call radio 106. The typical normal power level duration of the receiver 610 at the beginning of a frame when the frame includes no messages for the selective call radio is 200 msec, so a minimum duty cycle during the periodic portion of the power control signal which is generated by the active message section 646 (which occurs when no messages are being received) is typically 0.2 sec×16/(4×60) sec, which is 0.0133. Under the unusual circumstances of only one active frame per cycle, the duty cycle with no messages is typically 0.000833.

When the selective call radio 106 is in the activated mode and synchronization is lost, the sync element generates a signal indicating lost sync which is coupled to the activated state element 647, which begins generating the power control signal 648 from the second sync seek section 645. The second sync seek element generates the power control signal 648 to have normal power state levels generated every 1.5 seconds, each of which lasts one hundred milliseconds (msec), until synchronization is reacquired, which is illustrated by the group of normal power level pulses 460 in FIG. 4. Thus, the duty cycle during the periodic portion of the power control signal which is generated by the second sync seek section (which occurs when no messages are being received) is 0.1 sec/1.5 sec, which is 0.0667.

In summary, it will be appreciated that when the selective call radio is synchronous with the outbound signaling protocol, the ratio of the typical duty cycle in the activated state to the duty cycle in the inactivated state is greater than 0.0133/0.0000139, which is 959, and that when the selective call radio is not synchronous with the outbound signaling protocol, the ratio of the duty cycle in the activated state to the duty cycle in the inactivated state is greater than 0.067/0.000185, which is 362. Even in the unusual case when only one active frame per cycle is used in the activated synchronized state, the duty cycle in the activated state is substantially greater (0.000833/0.0000139, or 60 times) than the duty cycle in the inactivated state.

Thus, the duty cycle is substantially improved, by more than 60 times under all conditions, when the selective call radio 106 is in the inactivated state, in comparison to when it is in the activated state. In the inactivated state, the scanning latency is 24 hours in the example given, but could be as short as 2 hours while still achieving substantial power consumption reduction in many circumstances. The scanning latency in the inactivated state, which is approximately equivalent to the expected message latency, is substantially greater than the maximum acceptable message latency (2 and a half minutes) for an active selective call radio 106, and is therefore inappropriate for normal messaging use in the activated state. The substantial reduction in duty cycle during the inactivated state can be used to essentially eliminate all the battery drain that would otherwise be incurred, and this can be a very useful selling feature. The substantial duty cycle improvement is achieved by changing the frequency of activations of the receiver 610 such that the latency of message reception (message latency) is changed from an amount acceptable for an activated selective call radio 106 (typically less than 30 seconds, maximally approximately 2 and a half minutes) to an amount which is inappropriate for an activated selective call radio 106 (for example, 24 hours), but which is acceptable for initial activation of the selective call radio 106 by the radio communication system 100. For example, a pager could be sold in one country for use a couple of weeks later when a trip is ended in a another country and the battery would be fresh when the pager is activated. In a second example, a pager could be included in a watch and not be activated until needed, without having the pager cause nearly as substantial drain on a watch battery which is used by both the watch and the pager until the pager is needed.

It will be recognized by one of ordinary skill in the art that the longer intervals between the normal power states of the receiver 610 in the inactivated state of the selective call radio 106 (which are 24 hours in the example described) are a design choice determined by customer expectations and system parameters. It will be appreciated that an inactivated state as described herein could use a substantially smaller interval (e.g., 4 hours instead of 24 hours) when the selective call radio 106 is not synchronized to the outbound signaling protocol, without significantly affecting the overall duty cycle, inasmuch as the ratio of the duty cycle in the activated state to the duty cycle in the inactivated state is substantially greater than the same ratio when the selective call radio 106 is synchronized to the outbound signaling protocol. The duty cycle used by the standby message section could also be lengthened in the example chosen to increase the ratio of the activated state to the duty cycle of the inactivated state.

It will be further appreciated that the present invention is usable in radio communication systems 100 using other outbound signaling protocols than the one described herein, as long as the outbound signaling protocol includes uniquely identified protocol divisions substantially longer than the longest interval used for a battery saving duty cycle when the selective call radio 106 is in a normal, activated state. (In the example, the longest interval used for the normal activated state is four minutes, and the protocol divisions are defined up to more than a year). A real time clock 644 as described above is not necessary, inasmuch as a counter can be used to count protocol divisions as a substitute.

The controls element 634 is coupled to a set of switches 670, to which the controls element 634 is responsive for setting and controlling a plurality of operational modes of the selective call radio 106. Depending on the operational mode of the selective call radio 106, and depending on the contents of received messages, the controller 635 couples information included in the messages to a display 650 for presentation and/or stores information included in the message for later presentation, such as generating an audible speech signal from a speaker (not shown in FIG. 4) by decompressing a digitized compressed speech signal. Also depending on the operational mode of the selective call radio 106, a sensible alert device 660, for example, a tone alert device or a vibration alert device, is activated in response to the message. In this example, upon determining that a message includes a text message, the controller 635 couples the text message to the display 650.

An optional operational mode controlled by the set of switches 670 is the activation mode, which is illustrated by the dashed line in FIG. 3 coupling the controls element to the activation mode element 640. This optional controlled mode allows a user to set the selective call radio 106 into the inactivated state without a programming or other maintenance tool. The change to the activated state is still by means of the activation indication message.

The receiver 610 in the preferred and alternative embodiments of the present invention in FIG. 3 is preferably a conventional dual conversion receiver of a type well known to those skilled in the art, but can alternatively be of other conventional types, such as a single conversion or zero intermediate frequency (ZIF) receiver. The code memory 655 is conventional EPROM, or conventional SRAM or another conventional memory type which is well known to those skilled in the art. The display 650 is an LCD display of a type well known to those skilled in the art, and the antenna 680, switches 670, and alert device 660 are devices also well known to those skilled in the art. The controller 635 is preferably implemented within a controller section of the selective call radio 106 which includes, but is not limited to, conventional hardware circuits including a microprocessor, timing circuits, random access memory, non-volatile memory such as EPROM, and input/output circuitry. The conventional functions of the bit recovery element 615, the block word decoder 632, the sync element 631, the real time clock 644, and the message processor element 636 as described herein are controlled by firmware routines developed in accordance with techniques well known to one of ordinary skill in the art. The unique functions of the activation message element 633, the activation mode element 640, the inactivated state element 641, the first sync seek section 642, the standby message section 643, the activated state element 647, the second seek section 645, and the active message section 646 as described herein are controlled by unique firmware routines developed in accordance with techniques well known to one of ordinary skill in the art. The microprocessor is preferably one of the 68HC05 family microprocessors made by Motorola, Inc. of Schaumburg, Ill.

Figure 5:
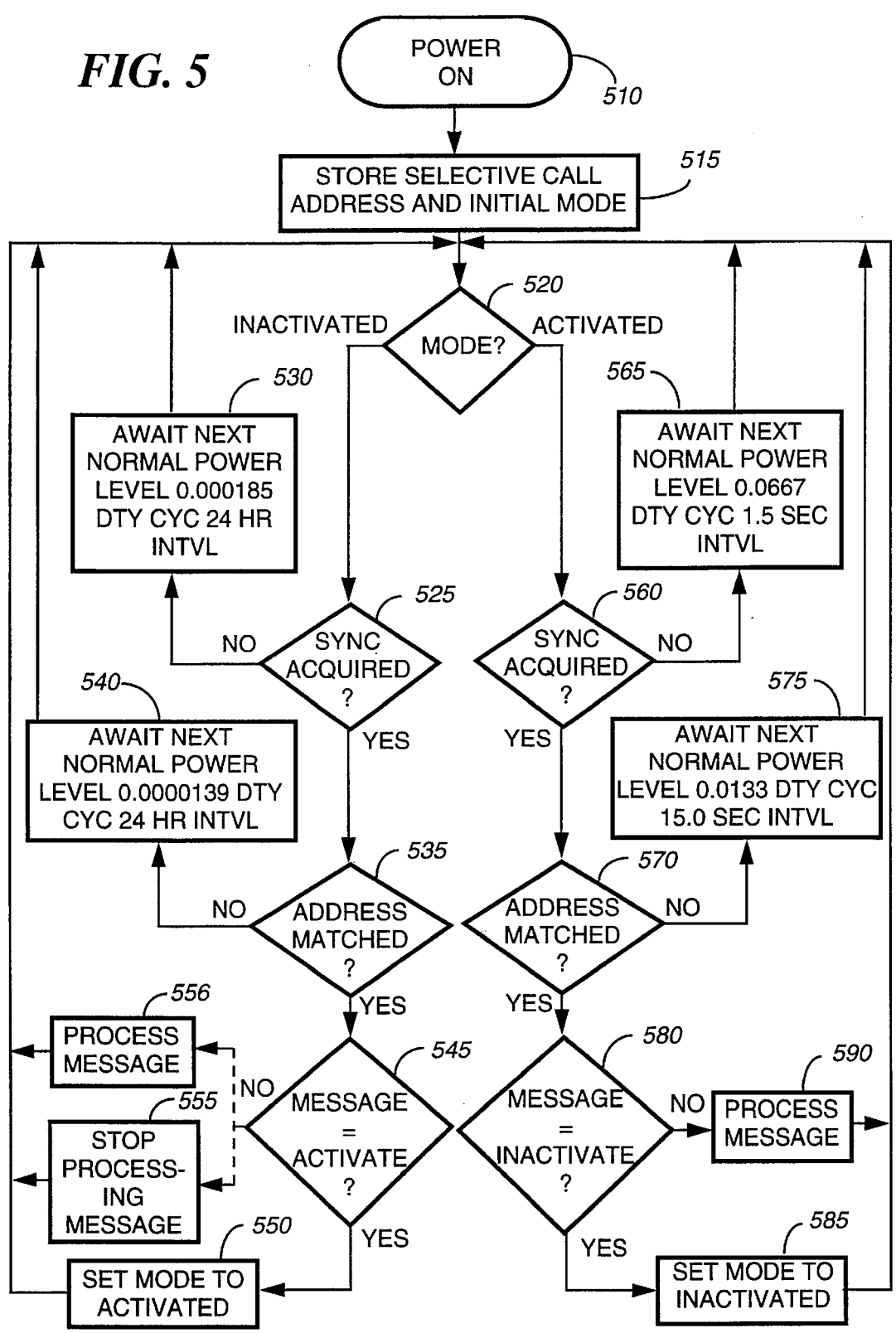
FIG. 5 is a flow chart of a method used in the selective call radio, in accordance with the preferred embodiment of the present invention.

Referring to FIG. 5, a flow chart of a method used in the selective call radio is shown, in accordance with the preferred embodiment of the present invention. At step 510, the power for the selective call radio 106 is turned on in response to a control switch 670 or insertion of a battery during maintenance of the selective call radio 106. At step 515, an embedded address is stored in the selective call radio 106 and an initial inactivated state is set in the selective call radio 106. Alternatively, at step 515, an activated state could be set in the selective call radio 106. At step 520, when the state is inactivated, and when synchronization is determined to be not acquired at step 525, the power control signal 648 is set to the low power level at step 530 for a first duration, preferably 24 hours, as determined by the first sync seek section 642. The power control signal 648 is then cycled between the normal power level and the low power level at a predetermined rate, preferably 160 times in four minutes, with a predetermined normal power level duration, preferably 100 msec, as determined by the first sync seek section 642. (The resultant interval is 24 hours and the duty cycle is 0.000185). During the normal power level the sync element 631 attempts to establish synchronism with the outbound signaling protocol. The method then proceeds at step 520. At step 525, when synchronization is determined to be established, addresses received by the receiver 610 are compared at step 535 to the embedded address. When an address match is not found at step 535, the power state is set to the low power level at step 540 for a predetermined duration, preferably 24 hours, as determined by the standby message section 643, and then switched to the normal power level for a predetermined typical duration, preferably 1,200 msec. (The resultant interval is 24 hours and the duty cycle is 0.0000139). The method then proceeds at step 520. When an address match is found at step 535, the normal power level is maintained by the controller 635 as necessary to receive and process a message received in the radio signal which corresponds to the matched address. When the received message is determined to be an activation message at step 545, the activation mode element 640 changes the activation mode of the selective call radio 106 to the activated state at step 550, and the method proceeds at step 520. When the received message is determined not to be an activation message at step 545, the message processor element 636 ceases further processing of the message at step 555. In an alternative embodiment, when the received message is not an activation message, the message processor element 636 processes the message at step 556 in accordance with the contents of the message.

At step 520, when the state is activated, and when synchronization is determined to be not acquired at step 560, the power state is set to the low power level at step 565 and then cycled between the normal power level and the low power level at a predetermined rate, preferably 160 times in four minutes, with a predetermined normal power level duration, preferably 100 msec, as determined by the second sync seek section 645. (The resultant interval is 1.5 seconds and the duty cycle is 0.0667). During the normal power level the sync element 631 attempts to establish synchronism with the outbound signaling protocol. The method then proceeds at step 520. At step 560, when synchronization is determined to be established, addresses received by the receiver 610 are compared at step 570 to the embedded address. When an address match is not found at step 570, the power state is set to the low power level at step 575 for a predetermined duration, preferably 15 seconds, as determined by the active message section 646, and then switched to the normal power level for a predetermined typical duration, preferably 200 msec. (The resultant interval is 15 seconds and the duty cycle is 0.0133). The method then proceeds at step 520. When an address match is found at step 570, the normal power level is maintained by the controller 635 as necessary to receive and process a message received in the radio signal which corresponds to the matched address. When the received message is determined at step 580 to be an inactivation message, the activation mode element 640 changes the activation mode of the selective call radio 106 to the inactivated state at step 585, and the method proceeds at step 520. When the received message is determined not to be an inactivation message at step 580, the message processor element 636 further processes the message at step 590 in accordance with the contents of the message.

By now it should be appreciated that there has been provided a technique which substantially reduces power consumption in a selective call radio for use in a radio communication system during an inactivated state of the selective call radio, thereby extending the life of a battery which powers the selective call radio.

We claim:

1. A method used within a selective call radio for substantially reducing power consumption of the selective call radio while the selective call radio is in an inactivated state, wherein the selective call radio is for receiving digital signals having a periodic protocol, and wherein said digital signals are transmitted by radio signals in a radio system, said method comprising the steps of:

storing a selective call address within the selective call radio;

setting an activation mode of the selective call radio to the inactivated state during which a power state of the selective call radio is cycled at an inactivated duty cycle, and during which a first selective call message having the selective call address is received and processed; and setting the activation mode of the selective call radio to an activated state during which the power state of the selective call radio is cycled at an activated duty cycle which is substantially greater than the inactivated duty cycle, in response to an activation command generated during the inactivated state set in said step of setting the activation mode to the inactivated state.

2. The method in accordance with claim 1, wherein the activated duty cycle is at least 60 times greater than the inactivated duty cycle.

3. The method in accordance with claim 1, further comprising the step of generating the activation command in response to the first selective call message when the first selective call message is an activation message.

4. The method in accordance with claim 1, wherein the method further comprises the step of:

processing no other messages except the first selective call message which is an activation message when the activation mode is in the inactivated state.

5. The method in accordance with claim 1, wherein the activation command is generated in response to activation of controls on the selective call radio.

6. The method in accordance with claim 1, wherein the step of setting the activation mode of the selective call radio to the inactivated state further comprises the steps of:

searching for synchronization to said digital signals by periodically cycling, at a synchronizing duty cycle, the power state of the selective call radio from a low power state, during which a receiver section of the selective call radio does not receive said digital signals, to a normal power state, during which the receiver section receives said digital signals;

establishing synchronization with said digital signals when an predetermined synchronization portion of one of said digital signals is received and decoded during the normal power state in said step of searching for synchronization; and awaiting a selective call message by periodically cycling the power state of the selective call radio from the low power state to the normal power state at a standby duty cycle; and wherein the inactivated duty cycle is determined by a greater of the synchronizing duty cycle and the standby duty cycle.

7. The method according to claim 1 wherein the inactivated duty cycle establishes an expected message latency in the inactivated state which is inappropriate for messaging in the activated state.

8. The method according to claim 1, wherein the inactivated duty cycle establishes an expected message latency which is substantially greater than two and one half minutes in the inactivated state.

9. A selective call radio within which power consumption is substantially reduced while the selective call radio is in an inactivated state, wherein the selective call radio is for receiving digital signals having a periodic protocol, and wherein said digital signals are transmitted by radio signals in a radio system, said selective call radio comprising:

a memory for storing a selective call address within the selective call radio;

a receiver section for receiving radio signals;

a controller, coupled to said memory and said receiver section, for acquiring synchronization and for decoding and processing selective call messages from the radio signals, said controller further comprising:

an activation mode element for setting an activation mode of the selective call radio to one of the inactivated state and an activated state;

an inactivated state element, coupled to said activation mode element, for operating the selective call radio in the inactivated state during which a power state of the selective call radio is cycled at an inactivated duty cycle, and during which a first selective call message having the selective call address is received and processed; and an activated state element, coupled to said activation mode element, for operating the selective call radio in the activated state during which the power state of the selective call radio is cycled at an activated duty cycle which is substantially greater than the inactivated duty cycle; and wherein said activation mode element sets the activation mode to the activated state in response to an activation command generated during the inactivated state.

10. The selective call radio in accordance with claim 9, wherein the activated duty cycle is at least 60 times greater than the inactivated duty cycle.

11. The selective call radio in accordance with claim 9, further comprising an activation message element, coupled to said activation mode element and to said receiver section, for generating the activation command in response to the first selective call message when the first selective call message is an activation message.

12. The selective call radio in accordance with claim 9, further comprising: a message processor, coupled to said activation mode element and said receiver section, for processing selective call messages when the activation mode is in the activated state and for processing no selective call messages when the activation mode is in the inactivated state.

13. The selective call radio in accordance with claim 9, further comprising a controls element coupled to said activation mode element, for generating the activation command in response to controls on the selective call radio.

14. The selective call radio in accordance with claim 9, wherein the controller further comprises:

an synchronization seek section, coupled to said receiver section and said activation mode element, for searching for synchronization to said digital signals by periodically cycling, at a synchronizing duty cycle, the power state of the selective call radio from a low power state, during which the receiver section of the selective call radio does not receive said digital signals, to a normal power state, during which the receiver section receives said digital signals;

a synchronization section, coupled to said receiver section, for establishing synchronization with said digital signals when an predetermined synchronization portion of one of said digital signals is received and decoded during the normal power state; and a standby enabler element, coupled to said receiver section and said activation mode element, for awaiting a selective call message by periodically cycling the power state of the selective call radio from the low power state to the normal power state at a standby duty cycle; and wherein the inactivated duty cycle is determined by a greater of the synchronizing duty cycle and the standby duty cycle.

15. The selective call radio according to claim 9 wherein the inactivated duty cycle establishes an expected message latency in the inactivated state which is inappropriate for messaging in the activated state.

16. The selective call radio according to claim 9, wherein the inactivated duty cycle establishes an expected message latency which is substantially greater than two and one half minutes in the inactivated state.

* * * * *